(12) United States Patent
Kim et al.

(10) Patent No.: US 9,005,787 B2
(45) Date of Patent: Apr. 14, 2015

(54) SECONDARY BATTERY

(75) Inventors: Daekyu Kim, Suwon-si (KR); Ikkyu Kim, Suwon-si (KR); Seokjoon Yoon, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 439 days.

(21) Appl. No.: 12/788,587

(22) Filed: May 27, 2010

(65) Prior Publication Data

US 2010/0310906 A1 Dec. 9, 2010

(30) Foreign Application Priority Data

Jun. 8, 2009 (KR) .................. 10-2009-0050501

(51) Int. Cl.
| | |
|---|---|
| *H01M 2/12* | (2006.01) |
| *H01M 2/00* | (2006.01) |
| *H01M 2/34* | (2006.01) |
| *H01M 10/052* | (2010.01) |
| *H01M 10/30* | (2006.01) |
| *H01M 10/34* | (2006.01) |

(52) U.S. Cl.
CPC .......... *H01M 2/1241* (2013.01); *H01M 2/1229* (2013.01); *H01M 2/1235* (2013.01); *H01M 2/345* (2013.01); *H01M 10/052* (2013.01); *H01M 10/30* (2013.01); *H01M 10/345* (2013.01)

(58) Field of Classification Search
CPC ... H01M 2/12; H01M 2/1229; H01M 2/1241; H01M 2/345; H01M 2/1235
USPC .............. 429/82–89, 53–60, 71, 163
See application file for complete search history.

(56) References Cited

U.S. PATENT DOCUMENTS 3,831,822 A * 8/1974 Zundel .................. 222/397
3,940,287 A * 2/1976 Urry .................... 429/56

(Continued)

FOREIGN PATENT DOCUMENTS

| CA | 2099657 | * | 2/1994 |
| JP | 5343043 A | | 12/1993 |

(Continued)

OTHER PUBLICATIONS

Timings R.L., Mechanical Engineer's Pocket Book, 2006, Elsevier, Third Edition, 666.*

(Continued)

*Primary Examiner* — Milton I Cano
*Assistant Examiner* — Jimmy K Vo
(74) *Attorney, Agent, or Firm* — Robert E. Bushnell, Esq.

(57) ABSTRACT

A secondary battery, in which working pressure and rupture pressure of a safety vent are effectively controlled with respect to a slope of the safety vent and shapes of rupturable grooves. The secondary battery includes an electrode assembly arranged within a can, a cap assembly coupled to the can and including a lower portion arranged above the electrode assembly and having a through-hole arranged at a center thereof, a safety vent electrically connected to the electrode assembly through the through-hole and an insulator arranged between the safety vent and the lower portion of the cap assembly, wherein a first distance between a portion of the safety vent arranged at a region near the through-hole and the lower portion of the cap assembly is smaller than a second distance between a portion of the safety vent positioned furthest from the through-hole and the lower portion of the cap assembly.

15 Claims, 5 Drawing Sheets

(56) References Cited

U.S. PATENT DOCUMENTS

| | | | |
|---|---|---|---|
| 5,418,082 A * | 5/1995 | Taki et al. | 429/53 |
| 5,707,756 A * | 1/1998 | Inoue et al. | 429/57 |
| 6,210,824 B1 * | 4/2001 | Sullivan et al. | 429/53 |
| 6,265,101 B1 * | 7/2001 | Tucholski | 429/163 |
| 6,274,264 B1 * | 8/2001 | Azema | 429/53 |
| 6,346,342 B1 * | 2/2002 | Li | 429/56 |
| 7,060,386 B2 | 6/2006 | Abe | |
| 7,550,225 B2 | 6/2009 | Meguro et al. | |
| 7,572,544 B2 | 8/2009 | Kozuki et al. | |
| 2002/0037458 A1 | 3/2002 | Yamaguchi et al. | |
| 2003/0194601 A1 * | 10/2003 | Lei | 429/61 |
| 2006/0078787 A1 * | 4/2006 | Sato et al. | 429/62 |
| 2007/0059586 A1 | 3/2007 | Matsumoto et al. | |
| 2007/0134547 A1 * | 6/2007 | Bouffard et al. | 429/56 |
| 2007/0212595 A1 | 9/2007 | Kim et al. | |
| 2008/0182159 A1 | 7/2008 | Mitani et al. | |
| 2008/0206633 A1 | 8/2008 | Matsuoka | |
| 2009/0061310 A1 | 3/2009 | Kim et al. | |

FOREIGN PATENT DOCUMENTS

| | | |
|---|---|---|
| JP | 200718962 A | 1/2007 |
| KR | 1020010107665 A | 12/2001 |
| KR | 1020070093171 A | 9/2007 |
| KR | 1020090022418 A | 3/2009 |

OTHER PUBLICATIONS

Korean Examination Report dated Sep. 24, 2010 issued by the KIPO corresponding to Korean Patent Application No. 10-2009-0050501, together with a Request for Entry.

* cited by examiner

SECONDARY BATTERY

CLAIM OF PRIORITY

This application makes reference to, incorporates the same herein, and claims all benefits accruing under 35 U.S.C §119 from an application earlier filed in the Korean Intellectual Property Office on 8 Jun. 2009 and there duly assigned Serial No. 10-2009-0050501.

BACKGROUND OF THE INVENTION

1. Field of the Invention

An aspect of the present invention relates to a secondary battery.

2. Description of the Related Art

In recent years, compact and light portable electric and electronic appliances, such as cellular phones, laptop computers and camcorders are being actively developed and produced. Battery packs are employed in the portable appliances respectively to operate the portable appliances, especially in places where separate power sources are not provided. Considering economic aspects, the battery packs are recently employing chargeable and dischargeable batteries. The batteries include nickel-cadmium (Ni—Cd) batteries, nickel-metal hydride (Ni-MH) batteries, lithium batteries, and lithium ion secondary batteries.

In particular, lithium ion secondary batteries are being widely employed as power sources of portable electronic appliances, and have operational voltages approximately three times as high as those of nickel-cadmium batteries and nickel-metal hydride batteries. Lithium ion secondary batteries are also being widely employed due to their high energy density per weight.

SUMMARY OF THE INVENTION

An aspect of the present invention provides a secondary battery in which operation and rupture pressure of a safety vent are effectively controlled in accordance with a slope of the safety vent and a shape of a rupturable groove arrangement.

In accordance with an aspect of the present invention, a secondary battery includes an electrode assembly, a can accommodating the electrode assembly and a cap assembly coupled to the can, the cap assembly including a lower portion arranged at an upper side of the electrode assembly and having a through-hole arranged at a center thereof, a safety vent electrically connected to the electrode assembly through the through-hole and an insulator arranged between the safety vent and the lower portion of the cap assembly, wherein a first distance between a portion of the safety vent arranged at a region near the through-hole and the lower portion of the cap assembly is smaller than a second distance between a portion of the safety vent positioned furthest from the through-hole and the lower portion of the cap assembly.

The safety vent have a slope in the range of 1 degree to 5 degrees with respect to the lower portion of the cap assembly due to a difference between the first distance and the second distance. The safety vent can include an edge portion having a Z-shaped cross section, and wherein a lower length of a lower area of the safety vent being greater than an exposed distance of an exposed area of upwardly exposing the lower area to the upper side. The exposed distance can be equal to or greater than ⅔ of the lower length and is less than the lower length. The safety vent can include a protrusion downwardly protruding from the center of the safety vent and passing through the through-hole in the lower portion of the cap assembly.

The cap assembly can further include an upper portion arranged at an upper side of the safety vent to transmit electric current from the electrode assembly to the outside and a lower plate installed at a lower side of the lower portion and contacting the protrusion of the safety vent. The safety vent to separate from the lower plate when an internal pressure within the can increases to above a rupture pressure by raising the protrusion. The safety vent can be welded to the lower plate by one of laser welding, resistance welding, or an equivalent welding thereof.

The safety vent can also include a rupturable groove arrangement arranged on an upper side of the safety vent, the rupturable groove arrangement to break when the internal pressure of the can increases to above a rupture pressure. The rupturable groove arrangement can have a shape selected from a group consisting of a ring shape and a cross shape. The rupturable groove arrangement can include a first rupturable groove having a ring shape and being arranged around the center of the safety vent and having a non-grooved portion arranged at a side thereof, a second rupturable groove having a ring shape and being arranged around the center of the safety vent, having a non-grooved portion arranged at a side thereof, and having a diameter greater than that of the first rupturable groove and a third rupturable groove having a cross shape and being arranged around the center of the safety vent. The first rupturable groove can have a diameter of 1 mm to 4 mm. The diameter of the second rupturable groove can be in the range of 5 mm to 8 mm.

According to another aspect of the present invention, there is provided a secondary battery that includes an electrode assembly, a can accommodating the electrode assembly and a cap assembly coupled to the can, the cap assembly including a lower portion arranged at an upper side of the electrode assembly and having a through-hole arranged at a center thereof, a safety vent electrically connected to the electrode assembly through the through-hole, the safety vent being inclined, about the through-hole, by a shallow angle with respect to the lower portion and an insulator arranged between the safety vent and the lower portion of the cap assembly at a periphery of the safety vent. The shallow angle can be in the range of 1 to 5 degrees.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Embodiments of the present invention will be described in detail with reference to accompanying drawings such that those skilled in the art can fully understand and carry out the present invention. The same reference numerals are assigned to the same elements throughout the drawings.

Figure 1:
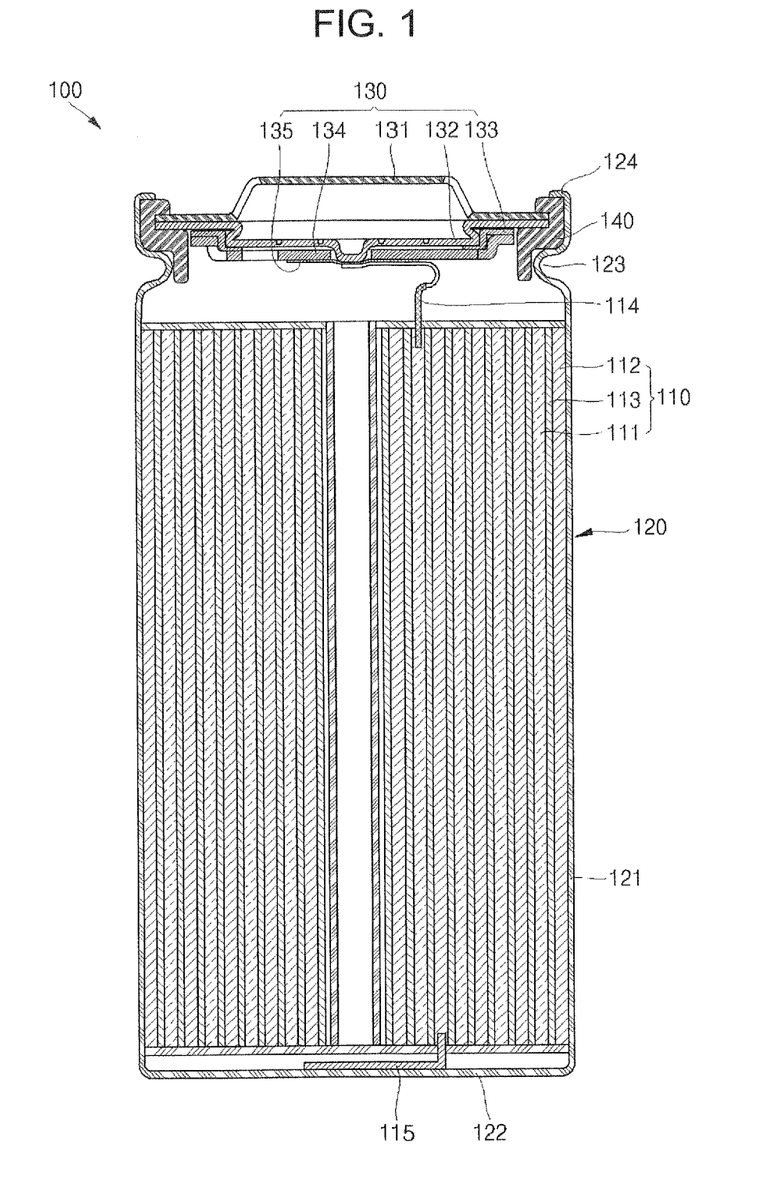
FIG. 1 is a vertical sectional view illustrating a secondary battery according to an embodiment of the present invention.
Figure 2:
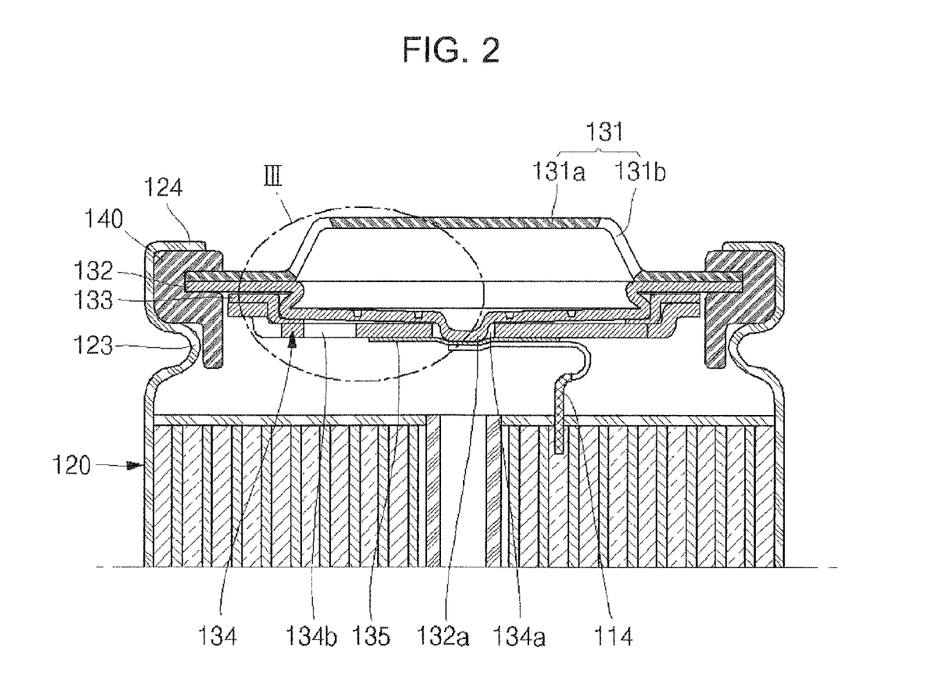
FIG. 2 is an enlarged sectional view illustrating a cap assembly in FIG. 1.
Figure 3:
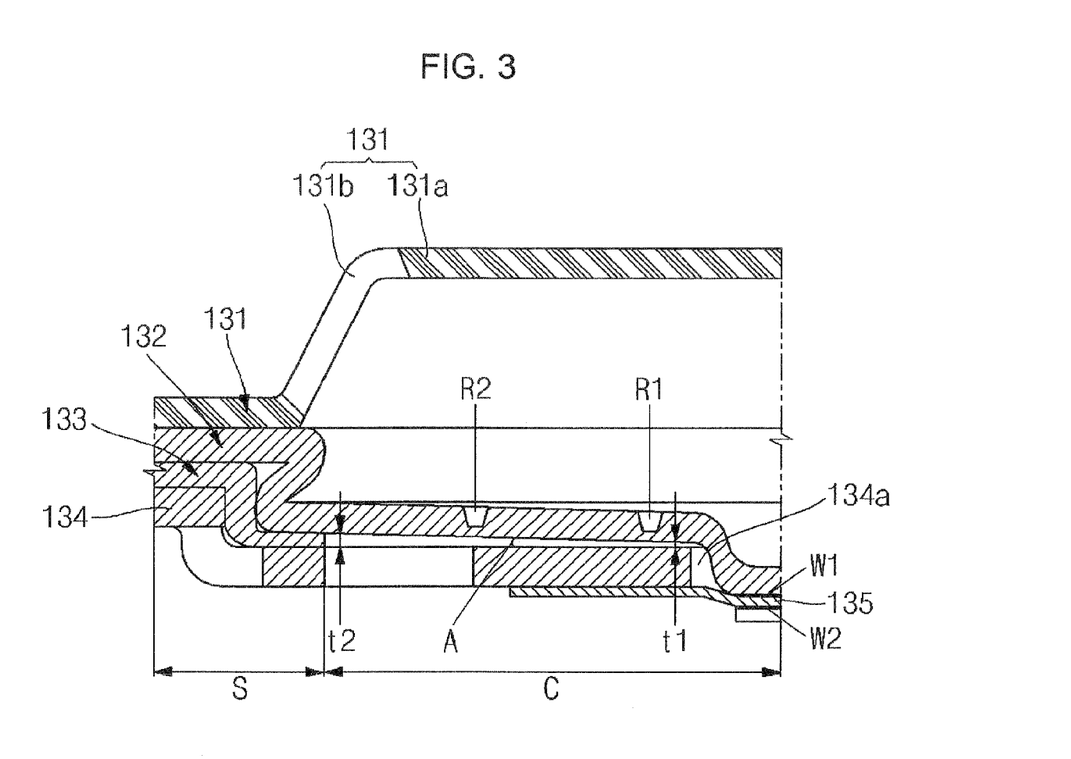
FIG. 3 is an enlarged sectional view of a portion 'III' in FIG. 2.
Figure 4:
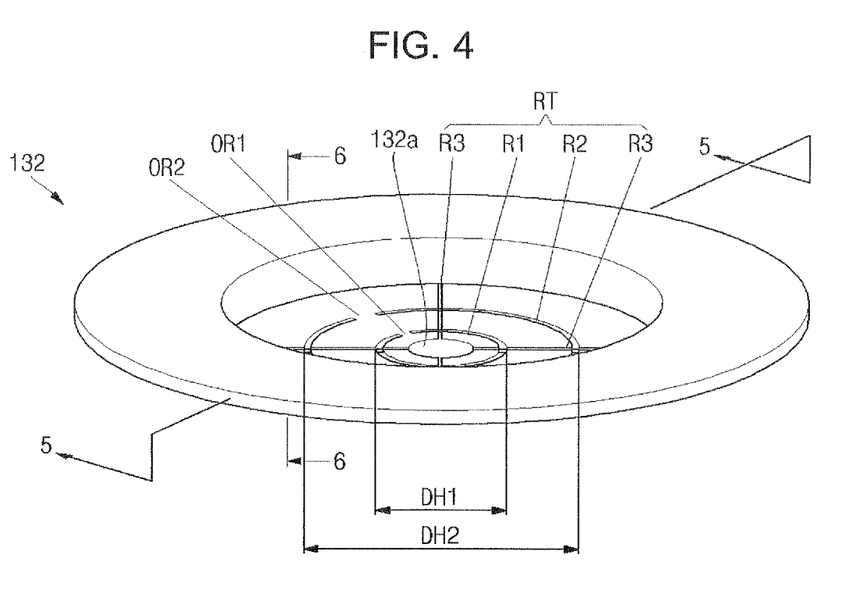
FIG. 4 is a perspective view illustrating a safety vent of the secondary battery in FIG. 1.
Figure 5:
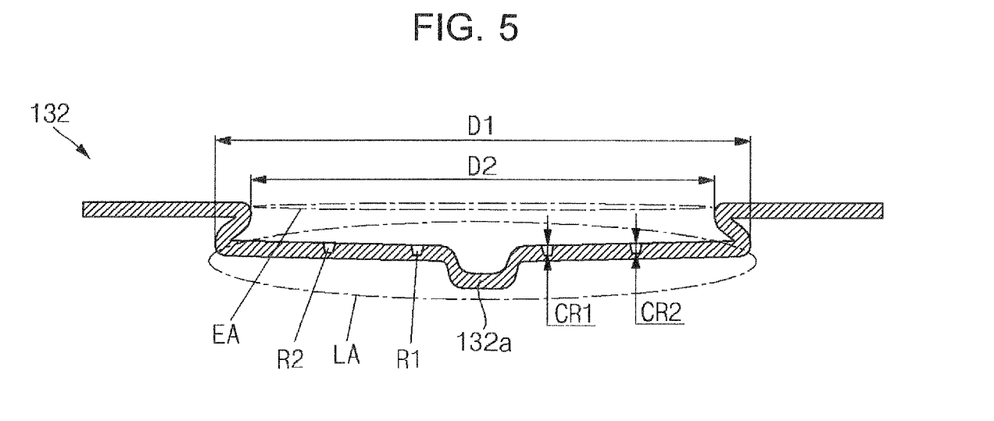
FIG. 5 is a sectional view of the safety vent taken along the line 5-5 in FIG. 4.
Figure 6:
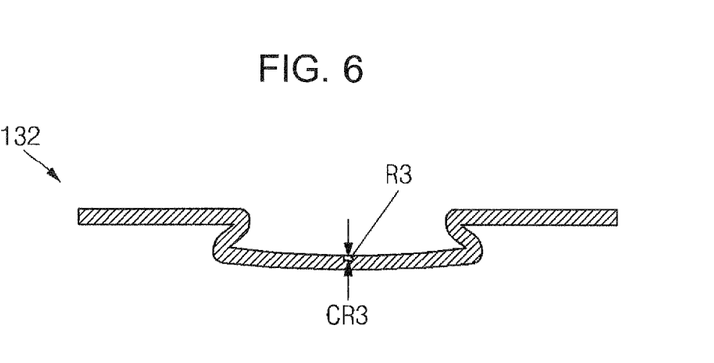
FIG. 6 is a sectional view of the safety vent taken along the line 6-6 in FIG. 4.

Turning now to the figures, FIG. 1 is a vertical sectional view illustrating a secondary battery according to an embodiment of the present invention, FIG. 2 is an enlarged sectional view illustrating a cap assembly of FIG. 1, FIG. 3 is an enlarged sectional view of a portion 'III' of FIG. 2, FIG. 4 is a perspective view illustrating a safety vent of the secondary battery of FIG. 1, FIG. 5 is a sectional view of the safety vent taken along the line 5-5 in FIG. 4 and FIG. 6 is a sectional view of the safety vent taken along the line 6-6 in FIG. 4.

Referring to FIGS. 1 to 3, a secondary battery 100 according to an embodiment of the present invention includes an electrode assembly 110, a can 120 accommodating the electrode assembly 110, a cap assembly 130 coupled to a top opening of the can 120, and a gasket 140 installed at an inner circumference of the top opening of the can 120 on which the cap assembly 130 is arranged.

The electrode assembly 110 can be produced by winding a positive electrode plate 111 in which surfaces of a positive electrode collector are coated with positive electrode active materials, a negative electrode plate 112 in which surfaces of a negative electrode collector are coated with negative electrode active materials, and a separator 113 disposed between the positive electrode plate 111 and the negative electrode plate 112 to insulate the positive electrode plate 111 from the negative electrode plate 112 in a jelly-roll shape. A positive electrode tab 114 is electrically connected to the cap assembly 130 at the upper side of the electrode assembly 110 and a negative electrode tab 115 is electrically connected to the bottom of the can 120 at the lower side of the electrode assembly 110.

The positive electrode collector of the positive electrode plate 111 is made out of conductive metal to collect electrons from the positive electrode active materials and to move the collected electrons to an external circuit. The positive electrode active materials are produced by mixing positive electrode active materials, conductive materials, and a binder and by coating the mixture onto the positive electrode collector to a preset thickness. Positive electrode non-coated portions are formed at both ends of the positive electrode plate 111 and are not coated with the positive electrode active materials. The positive electrode tab 114 is welded to one of the positive electrode non-coated portions.

The negative electrode collector of the negative electrode plate 112 is made out of conductive metal to collect electrons from the negative electrode active materials and to move the collected electrons to an external circuit. The negative electrode active materials are produced by mixing negative electrode active materials, conductive materials, and a binder and by coating the mixture onto the negative electrode collector to a preset thickness. Negative electrode non-coated portions are formed at both ends of the negative electrode plate 112 and are not coated with the negative electrode active materials. The negative electrode tab 115 is welded to one of the negative electrode non-coated portions.

The separator 113 can be disposed between the positive electrode plate 111 and the negative electrode plate 112 and can extend to surround the outer circumference of the electrode assembly 110. The separator 113 prevents an electrical short between the positive electrode plate 111 and the negative electrode plate 112. The separator 113 is made out of a porous polymer allowing lithium ions to pass therethrough.

The can 120 includes a cylindrical side plate 121 of a preset diameter to produce a space in which the electrode assembly 110 is accommodated within and a bottom plate 122 to seal the bottom of the side plate 121. In general, the can 120 can be made out of a light conductive metal such as aluminum or aluminum alloy and can be produced by a manufacturing method such as deep drawing. The top opening of the can 120 is open such that the electrode assembly 110 is inserted therethrough and then is sealed. In the upper side of the can 120, a beading portion 123 is formed to prevent the electrode assembly 110 from moving. A crimping portion 124 is formed at an uppermost portion of the can 120 to fix the cap assembly 130 thereto.

The cap assembly 130 includes an upper portion of cap assembly 131, a safety vent 132 arranged at the lower side of the upper portion of cap assembly 131, a lower portion of cap assembly 134 arranged under the safety vent 132, an insulator 133 arranged between the safety vent 132 and the lower portion of cap assembly 134, and a lower plate 135 fixed to the bottom of the lower portion of cap assembly 134, the lower plate being electrically connected to the positive electrode tab 114.

The upper portion of cap assembly 131 can be a circular plate and can be electrically connected to the outside through a terminal unit 131a protruding upward from the center of the upper portion of cap assembly 131. A gas vent 131b can be formed at an outer circumference to provide a path for gas generated within the can 120 to be expelled. The upper portion of cap assembly 131 is electrically connected to the electrode assembly 110 and transmits electric current generated from the electrode assembly 110 to the outside.

The safety vent 132 is a circular plate corresponding to the upper portion of cap assembly 131 and includes a protrusion 132a protruding downward from the center of a central region C and an edge portion S having a Z-shape cross section. The safety vent 132 is electrically connected to the lower plate 135 fixed to the bottom of the lower portion of cap assembly 134 via the protrusion 132 passing through a through-hole 134a of the lower portion of cap assembly 134. In this design, the protrusion 132a of the safety vent 132 and the lower plate 135 can be welded together by laser welding, resistance welding, or some other equivalent technique.

The safety vent 132 closely contacts portions of the upper portion of cap assembly 131, excluding the protruding terminal unit 131a of upper portion of cap assembly 131, to interrupt electric current and to expel internal gas when an abnormal pressure builds up within the can 120. The safety vent 132 separates from the lower plate 135 due to gas exhausted through a gas exhaust 134b when the internal pressure of the can 120 is equal to or greater than a working pressure of the safety vent 132. Protrusion 132a ascends during such a separation. When such a build up in internal gas pressure occurs, the welded portion of protrusion 132a is torn so that lower plate 135 becomes electrically separated from the safety vent 132. The safety vent 132 is broken when the internal pressure of the can 120 is equal to or greater than a breaking pressure of the safety vent 132, the breaking pressure being higher than the working pressure.

As illustrated in FIG. 3, in the safety vent 132, a first distance t1 between a portion of the safety vent 132 near the through-hole 134a and the lower portion of cap assembly 134 is smaller than a second distance t2 between a portion of the safety vent 132 far from the through-hole 134 and the lower portion of cap assembly 134. Due to the difference between the first distance t1 and the second distance t2, the safety vent 132 has a preset slope A with respect to the lower portion of cap assembly 134. Because of this slope A, the working pressure and the rupture pressure of the safety vent 132 can be more effectively controlled. Best results occur when the slope A is between 1 degree and 5 degrees. When the slope A is less than 1 degree, there is only a little difference between the safety vent having the slope less than 1 degree and the safety vent without any slope in controlling of the working pressure and the rupture pressure of the safety vent. When the slope A exceeds 5 degrees, the safety vent 132 can remain electrically connected to the lower portion of cap assembly 134 when the cap assembly needs to be spaced-apart from and electrically separated from the safety vent 132. In the following Table 1, data measuring the working pressure and the rupture pressure of the safety vent 132 according to slope A of the safety vent 132 are listed:

TABLE 1

| components of slope | no slope | | 1 degree | | degrees | |
|---|---|---|---|---|---|---|
| | working pressure | rupture pressure | working pressure | rupture pressure | working pressure | rupture pressure |
| reference pressure (kgf/cm$^2$) | 8 | 20 | 8 | 20 | 8 | 20 |
| average pressure (kgf/cm$^2$) | 8.26 | 21.49 | 8.10 | 19.95 | 7.96 | 20.47 |
| minimum pressure (kgf/cm$^2$) | 7.86 | 20.85 | 7.68 | 19.58 | 7.73 | 20.09 |
| maximum pressure (kgf/cm$^2$) | 8.62 | 22.30 | 8.50 | 20.39 | 8.17 | 20.65 |
| max. − min. pressure (kgf/cm$^2$) | 0.76 | 1.45 | 0.82 | 0.81 | 0.44 | 0.56 |
| Deviation | 0.186 | 0.333 | 0.217 | 0.217 | 0.140 | 0.197 |
| CPK | 3.13 | 1.53 | 3.84 | 4.54 | 4.68 | 4.28 |
| measured data | 8.32 | 21.57 | 7.86 | 19.98 | 7.73 | 20.34 |
| | 8.32 | 21.79 | 7.96 | 20.04 | 7.93 | 20.65 |
| | 8.19 | 21.82 | 8.12 | 20.01 | 7.86 | 20.65 |
| | 8.18 | 21.57 | 7.68 | 20.09 | 7.83 | 20.29 |
| | 8.62 | 22.00 | 8.26 | 19.88 | 8.06 | 20.47 |
| | 8.05 | 22.00 | 8.12 | 20.39 | 8.14 | 20.65 |
| | 8.24 | 22.30 | 8.50 | 19.58 | 8.17 | 20.36 |
| | 8.37 | 21.52 | 8.10 | 19.88 | 7.93 | 20.09 |
| | 8.53 | 22.23 | 8.26 | 19.87 | 7.91 | 20.62 |
| | 8.61 | 21.31 | 8.16 | 19.68 | 8.03 | 20.62 |
| | . | . | . | . | . | . |
| | . | . | . | . | . | . |
| | . | . | . | . | . | . |

As listed in Table 1, a process capability index (CPK) when the slope A of the safety vent 132 is 1 degree or 2 degrees is greater than that when the safety vent 132 has no slope. Deviation when the slope A is 1 degree or 2 degrees is less than that when the safety vent 132 has no slope. In general, the CPK can be calculated using deviation, a minimum value, and a maximum value of the data, and effective production and use are enabled when CPK is high. It can be understood that the working pressure and the rupture pressure of the safety vent 132 can be effectively controlled through the slope A.

Since the safety vent 132 has the edge portion S having a Z-shape cross section, a lower area LA of the safety vent 132 as illustrated in FIG. 5 can be greater than an exposed area EA that exposes the lower area LA to the upper side. That is, a lower distance D1 representing a sectional length of the lower area LA can be greater than an exposed distance D2 representing a sectional length of the exposed area EA. The exposed distance D2 can be equal to or greater than ⅔*(D1) of the lower length D1 while being less than the lower length D1. In other words, the exposed distance D2 can be expressed by the following inequality 1:

$$\frac{2}{3}D1 \le D2 < D1 \quad \text{[Inequality 1]}$$

When the exposed distance D2 is equal to or greater than the lower length D1, a section of the surroundings S cannot be formed in the Z-shape. On the other hand, when the exposed distance D2 is less than ⅔ of the lower length D1, an area of the Z-shaped portion is excessively wide. By having D2 less than D1 but at least ⅔*D1, because of the edge portion S having the Z-shape cross section, the operation and the rupture of the safety vent 132 can be effectively controlled according to the internal pressure of the can 120.

As illustrated in FIG. 4, the safety vent 132 can further include a rupturable groove arrangement RT that breaks when the internal pressure within the can 120 becomes higher than the rupture pressure. The rupturable groove arrangement RT can be arranged on the safety vent 132 and can have either a ring shape or a cross shape. In more detail, the rupturable groove arrangement RT can include a first rupturable groove R1, a second rupturable groove R2, and a third rupturable groove R3.

The first rupturable groove R1 is positioned around the protrusion 132a located at the center of the safety vent 132, has a ring shape and has a non-grooved portion OR1 formed at one side. The second rupturable groove R2 is arranged around the protrusion 132a located at the center of the safety vent 132, has a ring shape and has a non-grooved portion OR2 formed at one side. As illustrated in FIG. 5, second rupturable groove R2 is designed so that a diameter DH2 of the second rupturable groove R2 is greater than a diameter DH1 of the first rupturable groove R1.

In order for the safety vent 132 to effectively react against the working pressure and the rupture pressure, the diameter DH1 of the first rupturable groove R1 can be 1 mm to 4 mm and the diameter DH2 of the second rupturable groove R2 can be 5 mm to 8 mm. The diameter DH1 of the first rupturable groove R1 can not be less than 1 mm because of the protrusion 132a and the diameter DH2 of the second rupturable groove R2 must be less than the 8 mm diameter of the secondary battery 100.

The first and second rupturable grooves R1 and R2 can minimize separation of the safety vent 132 and generation of broken pieces or shrapnel due to the rupturable groove arrangement RT when the internal pressure within the can 120 becomes equal to or higher than the rupture pressure and the safety vent 132 is deployed.

The third rupturable groove R3 is located around the center of the first rupturable groove R1, that is, the protrusion 132a arranged at the center of the safety vent 132, and has a cross shape. As illustrated in FIGS. 5 and 6, a depth CR3 of the third rupturable groove R3 can be less than a depth CR1 of the first rupturable groove R1 and a depth CR2 of the second rupturable groove R2.

When the internal pressure of the can 120 is equal to or higher than the rupture pressure, at least one of the first ring-shaped rupturable groove R1 and the second ring-shaped rupturable groove R2 which are deeper than the depth CR3 of the third rupturable groove R3, is broken so that internal gas within the can 120 can be released. Since the safety vent 132 according to the present invention can react against the internal pressure of the can more sensitively than when all of the rupturable grooves have only a cross shape or only a ring shape, the safety vent 132 can react to the internal pressure of the can 120 more effectively.

The insulator 133 is made out of an insulating material and is disposed between the safety vent 132 and the lower portion of cap assembly 134 to insulate the safety vent 132 from the lower portion of cap assembly 134. The insulator 133 can be disposed between the safety vent 132 and the surroundings of the lower portion of cap assembly 134. By doing so, the safety vent 132 is spaced apart from the central region C of the lower portion of cap assembly 134. Therefore, the safety vent 132 can be electrically separated from the lower portion of cap assembly 134.

The lower portion of cap assembly 134 is a circular plate. The lower portion of cap assembly 134 has the through-hole 134a formed in the center thereof so that the protrusion 132a of the safety vent 132 can pass therethrough. The gas exhaust 134b is formed at a side of the lower portion of cap assembly 134 to exhaust gas raising the protrusion 132a of the safety vent 132 when the internal pressure of the can 120 increases to excessive levels.

As illustrated in FIG. 3, the lower plate 135 is welded to the protrusion 132a of the safety vent 132 that passes through the through-hole 134a of the lower portion of cap assembly 134 so that a welded portion W1 is present between the lower plate 135 and the protrusion 132a of the safety vent 132. In the present invention, the lower plate 135 can be welded to the protrusion 132a of the safety vent 132 by laser welding, resistance welding, or an equivalent welding. The lower plate 135 is also welded to the positive electrode tab 114 of the electrode assembly 110 so that a welded portion W2 is present between the lower plate 135 and the electrode assembly 110. By doing so, the lower plate 135 electrically connects the positive electrode tab 114 to the safety vent 132. The lower plate 135 can be electrically disconnected from the safety vent 132 when the protrusion 132a of the safety vent 132 and the welded portion W1 is separated from the lower plate 135 upon the internal pressure of the can 120 exceeding the rupture pressure. The gasket 140 is installed in the top opening of the can 120. In other words, the gasket 140 is tightly inserted between the outer circumferences of the upper portion of cap assembly 131 and the safety vent 132 and the top opening of the can 120. The gasket 140 can prevent the cap assembly 130 from being separated from the can 120.

As described above, in the secondary battery 100 according to the embodiment of the present invention, the safety vent 132 has a slope A so that the operation and the rupture pressure of the safety vent 132 can be effectively controlled. Moreover, in the secondary battery 100 according to the embodiment of the present invention, the rupturable groove arrangement RT of the safety vent 132, which is broken at a pressure higher than the rupture pressure, has a cross shape and/or a ring shape, so that the operation of the safety vent 132 can be effectively controlled vis-a-vis the internal pressure of the can 120.

Although exemplary embodiments of the present invention have been described in detail hereinabove, it should be understood that many variations and modifications of the basic inventive concept herein described, which can appear to those skilled in the art, will still fall within the spirit and scope of the exemplary embodiments of the present invention as defined by the appended claims.

What is claimed is:

1. A secondary battery, comprising:
an electrode assembly;
a can accommodating the electrode assembly; and
a cap assembly coupled to the can, the cap assembly including:
a lower portion arranged at an upper side of the electrode assembly and having a through-hole arranged at a center thereof;
a safety vent including a circular plate and a protrusion downwardly protruding from a center of the circular plate and passing through the through-hole in the lower portion of the cap assembly and being electrically connected to the electrode assembly through the through-hole in the lower portion of the cap assembly, wherein the safety vent further comprises a rupturable groove arrangement arranged on an upper side of the circular plate of the safety vent, the rupturable groove arrangement to break when an internal pressure of the can increases to above a rupture pressure;
an insulator arranged between the circular plate of the safety vent and the lower portion of the cap assembly, wherein a first distance between a portion of the circular plate of the safety vent arranged at a region near the through-hole and the lower portion of the cap assembly is smaller than a second distance between a portion of the circular plate of the safety vent positioned furthest from the through-hole and the lower portion of the cap assembly, wherein the safety vent has a slope in the range of 1 degree to 5 degrees with respect to the lower portion of the cap assembly due to a difference between the first distance and the second distance;
an upper portion arranged at an upper side of the safety vent to transmit electric current from the electrode assembly to the outside; and
a lower plate installed at a lower side of the lower portion of the cap assembly and contacting the protrusion of the safety vent.

2. The secondary battery of claim 1, wherein the safety vent includes an edge portion having a Z-shaped cross section, and wherein a lower length of a lower area of the safety vent being greater than an exposed distance of an exposed area of upwardly exposing the lower area to the upper side.

3. The secondary battery of claim 2, wherein the exposed distance is equal to or greater than $2/3$ of the lower length and is less than the lower length.

4. The secondary battery of claim 1, the safety vent being attached to the lower plate, wherein the safety vent is adapted to separate from the lower plate by raising the protrusion upon the internal pressure within the can increasing to above a rupture pressure.

5. The secondary battery of claim 1, wherein the safety vent is welded to the lower plate by one of laser welding, resistance welding, or an equivalent welding thereof.

6. The secondary battery of claim 1, wherein the rupturable groove arrangement prevents shrapnel from flying upon rupture by having a ring shape and having discontinuous portions about the ring shape.

7. The secondary battery of claim 1, wherein the rupturable groove arrangement comprises:
- a first rupturable groove having a ring shape and being arranged around the center of the circular plate of the safety vent and having a non-grooved portion arranged at a side thereof;
- a second rupturable groove having a ring shape and being arranged around the center of the circular plate of the safety vent, having a non-grooved portion arranged at a side thereof, and having a diameter greater than that of the first rupturable groove; and
- a third rupturable groove having a cross shape and being arranged around the center of the circular plate of the safety vent.

8. The secondary battery of claim 7, wherein the first rupturable groove has a diameter of 1 mm to 4 mm.

9. The secondary battery of claim 7, wherein the diameter of the second rupturable groove is in the range of 5 mm to 8 mm.

10. The secondary battery of claim 1, the lower plate being distinguished from the lower portion of the cap assembly.

11. A secondary battery, comprising:
- an electrode assembly;
- a can accommodating the electrode assembly; and
- a cap assembly coupled to the can, the cap assembly including:
  - a lower portion arranged at an upper side of the electrode assembly and having a through-hole arranged at a center thereof;
  - a safety vent including a protrusion that is electrically connected to the electrode assembly through the through-hole, the safety vent also including a circular plate that is inclined about the through-hole by a shallow angle with respect to the lower portion, the shallow angle being in the range of 1 to 5 degrees; and
  - an insulator arranged between the circular plate of the safety vent and the lower portion of the cap assembly at a periphery of the safety vent.

12. The secondary battery of claim 11, the protrusion of the safety vent being welded to a lower plate arranged on a lower side of the lower portion of the cap assembly, the lower plate being distinguished from the lower portion of the cap assembly and being electrically connected to the electrode assembly.

13. A secondary battery, comprising:
- an electrode assembly;
- a can accommodating the electrode assembly; and
- a cap assembly coupled to the can, the cap assembly including:
  - a lower portion arranged at an upper side of the electrode assembly and having a through-hole arranged at a center thereof;
  - a safety vent including a circular plate and a protrusion downwardly protruding from a center of the circular plate and passing through the through-hole in the lower portion of the cap assembly and being welded to a lower plate arranged on an opposite side of the lower portion of the cap assembly, the lower plate being electrically connected to the electrode assembly; and
  - an insulator arranged between the circular plate of the safety vent and the lower portion of the cap assembly, wherein a first distance between a portion of the circular plate of the safety vent arranged at a region near the through-hole and the lower portion of the cap assembly is smaller than a second distance between a portion of the circular plate of the safety vent positioned furthest from the through-hole and the lower portion of the cap assembly, wherein the safety vent is welded to the lower plate by one of laser welding, resistance welding, or an equivalent welding thereof, the safety vent having a slope in the range of 1 degree to 5 degrees with respect to the lower portion of the cap assembly due to a difference between the first distance and the second distance.

14. The secondary battery of claim 13, the safety vent has a rupturable groove arrangement on a top side thereof, the rupturable groove arrangement having a ring-shaped groove having discontinuous open portions absent of a groove to prevent pieces from flying upon rupture.

15. The secondary battery of claim 13, the safety vent has a rupturable groove arrangement on a top side thereof, the rupturable groove arrangement having a ring-shaped groove having a 3 mm diameter.

* * * * *